United States Patent [19]

Feinberg et al.

[11] 4,444,952
[45] Apr. 24, 1984

[54] THERMOPLASTIC MOLDING COMPOSITION

[75] Inventors: Stewart Feinberg, Exton; Harold Nicholson, West Chester, both of Pa.

[73] Assignee: Atlantic Richfield Company, Los Angeles, Calif.

[21] Appl. No.: 410,743

[22] Filed: Aug. 23, 1982

[51] Int. Cl.³ .............................................. C08L 53/00
[52] U.S. Cl. ...................................... 525/93; 525/98; 525/97; 525/96
[58] Field of Search .................... 525/93, 98, 96, 97

[56] References Cited

U.S. PATENT DOCUMENTS

| | | | |
|---|---|---|---|
| 4,124,654 | 11/1978 | Abolins et al. | 525/98 |
| 4,269,950 | 5/1981 | Abolins et al. | 525/93 |
| 4,288,399 | 9/1981 | Seidenstrang et al. | 525/98 |

*Primary Examiner*—Allan Lieberman
*Attorney, Agent, or Firm*—Dennis M. Kozak

[57] ABSTRACT

A thermoplastic molding composition containing a non-equimolar copolymer containing less than 50 mole percent of an $\alpha,\beta$-ethylenically unsaturated dicarboxylic acid or its anhydride and more than 50 mole percent of a monovinyl-substituted hydrocarbon monomer and an impact modifying substance consisting of a styrene/butadiene star block thermoplastic elastomer, is disclosed.

3 Claims, No Drawings

THERMOPLASTIC MOLDING COMPOSITION

This invention relates to thermoplastic molding compositions.

More specifically, this invention relates to molding compositions which provide molded articles having excellent impact properties.

In one of its more specific aspects, this invention pertains to a thermoplastic molding composition containing at least one thermoplastic polymer or copolymer, preferably a non-equimolar copolymer containing less than 50 mole percent of an $\alpha,\beta$-ethylenically unsaturated dicarboxylic acid or its anhydride and more than 50 percent mole percent of a monovinyl-substituted aryl hydrocarbon monomer and a sytrene/butadiene star block thermoplastic elastomer having 5 arms which imparts impact properties to the molding composition.

A common approach to imparting impact properties to thermoplastics such as polystyrene, polyethylene, polypropylene, copolymers of ethylene and propylene and poly(styrene-co-maleic anhydride) has been blending with certain styrene/butadiene thermoplastic elastomers. U.S. Pat. Nos. 4,095,550; 4,094,551; and 4,108,925 describe this technique and teach the use of styrene-butadiene-styrene linear triblock copolymers and styrene-butadiene 3-armed radial block polymers as impact modifiers. However, these thermoplastic elastomers are not well suited for use with poly(styrene-co-maleic anhydride) copolymers in that in order to achieve appreciable improvements in impact properties the impact modifier must be employed at high levels, typically levels to provide about 20% by weight or more rubber in the blend. A trade off in physical properties of the blend occurs when the level of rubber is too high—as the impact strength increases elevated temperature performance properties and flexural modulus are sacrificed.

It has now been discovered that the use of a lesser amount of a styrene/butadiene star block thermoplastic elastomer having at least 5-arms as compared to the amounts of prior art elastomers typically employed, facilitates the production of poly(styrene-co-maleic anhydride) molded articles having excellent impact properties and, quite surprising, having both excellent elevated temperature performance properties and flexural modulus.

According to this invention there is provided an improved thermoplastic molding composition of the type containing at least one thermoplastic polymer or copolymer and an impact modifying substance, wherein the improvement comprises: employing as the impact modifying substance a styrene/butadiene star block thermoplastic elastomer having at least about 5 arms.

In a preferred embodiment, the styrene/butadiene star block thermoplastic elastomer will have from about 6 to about 12 arms.

The thermoplastic elastomer star-block copolymers of this invention will be employed in an amount sufficient to provide from about 10 to about 20 percent by weight butadiene in the final molding composition.

The thermoplastic elastomer star-block copolymers suitable for use in this invention can be prepared by any suitable method. A preferred method is the following three-stage process.

In the first stage, the total amount of a monovinyl aromatic compound (described below) is polymerized in an inert solvent using a hydrocarbyllithium initiator (described below) to form linear segments of the monovinyl aromatic compound having lithium ions at the ends (A—Li). This polymerization is allowed to proceed to essential completion.

In the second stage, a conjugated diene (described below) is added and allowed to proceed to essentially complete conversion to form A—B—Li linear blocks.

In the third stage, a polyfunctional coupling agent is added to the solution of A—B—Li linear block segments to couple the segments into the radial block copolymer of general formula $(A—B)_{\overline{m}}X$, wherein m represents an integer of from 5 to 20; A represents a nonelastomeric polymer segment based on the total monovinyl aromatic compound, B represents an elastomeric polymer segment based on the conjugated diene and X represents the radial of the polyfunctional coupling agent.

The monovinyl aromatic compound employed to produce the star block copolymer is preferably styrene, but may be any alkyl substituted styrene which has similar copolymerization characteristics, such as, alpha-methylstyrene, the ring substituted methylstyrenes, ethylstyrenes and t-butylstyrene.

The monovinyl aromatic compound is employed in an amount within the range of from 20 to 55 percent by weight, preferably 30 to 50 percent by weight, based on the total weight of monomers utilized.

Hydrocarbyllithium initiators suitable for use are the known alkyllithium compounds, such as methyllithium, n-butyllithium, sec-butyllithium; the cycloalkyllithium compounds, such as cyclo-hexyllithium; and the aryllithium compounds, such as phenyllithium, p-toly-lithium and napthyllithium.

The hydrocarbyllithium initiator is employed in an amount within the range of from about 0.2 to 10.0 millimoles per mole of monomer. The total amount of initiator used depends on the molecular weight and number of polymer chains desired.

Conjugated dienes suitable for use are those having from 4 to 8 carbon atoms in the molecule, such as 1,3-butadiene, isoprene, 2,3-dimethyl-1,3-butadiene, piperylene and the like and mixtures thereof.

The polymerization is conducted in an inert hydrocarbon solvent such as isobutane, pentane, cyclohexane, benzene, toluene, xylene and the like and is carried out in the absence of air, moisture, or any other impurity which is known to be detrimental to anionic catalyst systems. The temperature of polymerization may be conventionally from about 0° to 120° C., and preferably between 40° and 80° C.

Polyfunctional coupling agents suitable for use include polyvinyl aromatic compounds such as divinylbenzene, which although only difunctional as monomers, can polymerize to form polyfunctional agents in situ and serve as coupling agents. Suitable are the ortho-, meta-, or para-divinylbenzenes, or mixtures thereof.

In the case of difunctional agents which polymerize during the coupling reaction, such as divinylbenzene, the amounts of agent to be used must be determined for the conditions of reaction, since the number of equivalent functional sites is variable. However, the amounts will vary only from 1.2 to 3.5 parts by weight, and preferably 1.3 to 3.0 parts by weight, of divinylbenzene per 100 parts by weight of total monomers.

The star block copolymer described above are suitable for use with any thermoplastic polymer or copolymer such as, for example, polystyrene, polyethylene, polypropylene, copolymers of ethylene and propylene and poly(styrene-co-maleic anhydride). As the poly(styrene-co-maleic anhydride) copolymer any non-equimolar copolymer containing less than 50 mole percent of an $\alpha,\beta$-ethylenically unsaturated dicarboxylic acid or its anhydride and more than 50 percent mole percent of a mono-vinyl-substituted aryl hydrocarbon monomer.

Dicarboxylic acids and anhydrides particularly suitable for use include maleic, fumaric, itaconic, citraconic, mesaconic, ethyl maleic, methyl itaconic, chloromaleic, bromomaleic, dichloromaleic, dibromomaleic, phenylmaleic and the like.

Suitable for use as the copolymerizable mono-vinyl-substituted aryl hydrocarbon monomers are those monomers containing 8 to 20 carbon atoms including styrene, alpha-methyl styrene, the nuclear methyl styrenes, ethyl styrene, isopropyl styrene, tert-butyl styrene, chlorostyrenes, dichlorostyrenes, bromostyrenes, dibromostyrenes, vinylnaphthalene, and the like.

The non-equimolar copolymers may be prepared by any of the several methods available for the preparation of non-equimolar copolymers or, they may be purchased commercially.

These copolymers may be prepared by solution polymerization directly from the respective monomers by the incremental addition of the reactive monomer as taught by U.S. Pat. No. 2,971,939; by a continuous recycle polymerization process such as described in U.S. Pat. Nos. 2,769,804 and 2,989,517; or by the suspension polymerization process described in U.S. Pat. No. 3,505,110. The teachings of these patents are incorporated herein by reference.

Particularly suitable for use are the non-equimolar copolymers of styrene and maleic anhydride, poly(styrene-co-maleic anhydride), designated Dylark ® copolymers, commercially available from ARCO Chemical Company, division of Atlantic Richfield Company. Suitable Dylark copolymers include those of the 200 Series and the 300 Series.

A particularly suitable poly(styrene-co-maleic anhydride) copolymer for use in the blends of this invention and employed in the following examples is Dylark 232 copolymer. Dylark 232 copolymer contains about 8 weight percent maleic anhydride, 92 weight percent styrene and has the following properties:

| Resin Properties | ASTM Method | Value |
|---|---|---|
| Tensile Strength, psi | D-638 | 7,200 |
| Tensile Elongation, % | D-638 | 1.8 |
| Tensile Modulus, psi | D-638 | 440,000 |
| Flexural Strength, psi | D-790 | 12,500 |
| Flexural Modulus, psi | D-790 | 450,000 |
| Izod Impact, ft.lbs./inch of notch | D-256 | 0.4 |
| Deflection Temperature Under Load, °F. 264 psi 0.5" × 0.5" bar annealed at 194° F. | D-648 | 235 |
| Vicat Softening Point, °C. | D-1525 | 118 |

The following examples further illustrate the invention. All parts and percentages are by weight unless otherwise specified.

EXAMPLE 1

This example demonstrates the preparation of a styrene butadiene star block thermoplastic elastomer suitable for use as an impact modifying-substance in the blends of this invention.

A one gallon stirred reactor was charged with 2,000 g. of purified cyclohexane and heated to 60° C. A trace of diphenylethylene (0.2 g.) was added to the cyclohexane by means of a hypodermic needle. A solution of sec-butyl-lithium in cyclohexane was added to the reactor portionwise until a permanent orange-yellow color was obtained. The solution was then backtitrated with cyclohexane until the color just disappeared.

Into the closed reactor was charged 6.78 m. moles of sec-butyllithium and 193.8 g. of styrene and the reactor held at 60° C. for 20 minutes. Analysis of the solution by U.V. analysis showed that less than 0.01% by weight of the styrene monomer remained. Number average molecular weights ($M_n$) of the polystyrene blocks were determined by Gel Permeation Chromatography to be 32,400. At this point, 316.2 g. of butadiene was added to the reactor and the whole mixture held for 60 minutes to complete the polymerization of the butadiene. The diblock arms thus formed were analyzed by refractive index and found to be 38% by weight styrene and 62% butadiene. There was then added 40.7 milimoles of divinylbenzene of 55% purity and the reactor contents were held for about 1 hour at 70° C. to complete the linking reaction. The system was terminated by the addition of 1 g. of methanol. The polymer solution was transferred to a 5 gallon polyethylene lined pail, diluted further with acetone and the polymer was recovered by precipitation from isopropanol under high speed stirring. The polymer was then treated with 0.5 part Polygard HR, a commercial antioxidant, and 0.5 part 2,6-ditert-butyl-4-methylphenol per 100 parts by weight of polymer. The wet polymer was dried at 50° C. in an oven under vacuum at less than 100 millimeters of mercury.

The resulting star-block polymer was found to have an $M_n$ of about 994,000 and about 7 linear arms.

Examples II through IV set forth in following Table I, show the pertinent data for three more styrene/butadiene star block thermoplastic elastomers produced using the method of Example I.

TABLE I

| | Examples II–IV | | | | | |
|---|---|---|---|---|---|---|
| | Amounts of Ingredients | | | Mn | | |
| Example No. | sec-butyl-lithium | styrene | butadiene | polystyrene block | star block | No. of arms |
| II | 6.70 mmole | 255.0 g | 255.0 g | 43,700 | 883,000 | 7 |
| III | 3.40 mmole | 122.0 g | 260.0 g | 40,000 | 1,400,000 | 13 |
| IV | 4.00 mmole | 145.0 g | 237.0 g | 43,000 | 1,300,000 | 6 |

Four blends, each containing 75 parts of Dylark 232 copolymer and 25 parts of one of the above produced styrene/butadiene star block thermoplastic elastomers, were separately prepared in toluene, recovered by precipitation into methanol and pelletized for injection molding of samples following two passes through a 0.8 inch Sterling extruder fitted with a devolatilizing screw.

The properties of these four blends each containing as an impact modifying substance a styrene/butadiene star block thermoplastic elastomer are shown in following Table II.

Also shown in Table II are five prior art blends. Each prior art blend contained 75 parts of Dylark 232 copolymer and 25 parts of either a styrene-butadiene-styrene linear tri block copolymer or a styrene-butadiene 3- armed radial block polymer. All five blends were prepared as described above.

TABLE II

Properties of 75/25 Blends of Dylark 232 Copolymer/Impact Modifying Substance

| Impact Modifying Substance | Number of Arms | % of Butadiene in Blend | $MI_L$[4] | Notched Izod[5] (ft-lb/in) | Flexural[6] Modulus ($\times 10^3$ psi) | Vicat Softening Point (°C) |
|---|---|---|---|---|---|---|
| Example I (Invention) | 7 | 15.5 | 1.0 | 2.4 | 321 | N.D. |
| Example II (Invention) | 7 | 12.5 | 0.6 | 1.7 | 310 | N.D. |
| Example III (Invention) | 13 | 17.0 | 0.6 | 3.6 | 329 | 119 |
| Example IV (Invention) | 6 | 15.5 | 0.4 | 4.4 | 311 | 118 |
| Kraton 1101[1] (Prior Art) | 2 | 17.5 | 1.8 | 1.6 | 300 | 117.5 |
| Kraton 1102[1] (Prior Art) | 2 | 18.0 | 6.0 | 1.7 | 220 | 118 |
| Kraton 1107[2] (Prior Art) | 2 | 21.5[8] | 7.8 | 1.9 | 124 | 115.5 |
| Solprene 411[3] (Prior Art) | 3 | 15.0 | 1.9 | 0.8 | 307 | 117 |
| Solprene 414[3] (Prior Art) | 3 | 17.5 | 0.6 | 2.0 | 200 | 115 |

[1]Shell Chemical Company - styrene-butadiene-styrene linear triblock copolymer
[2]Shell Chemical Company - styrene-isoprene-styrene linear triblock copolymer
[3]Phillips Chemical Company - styrene-butadiene radial block copolymer
[4]230° C., 2160 gm
[5]D-256
[6]D-790
[7]D-1525
[8]Isoprene
N.D. = not determined It will be seen from the above data that the incorporation of a styrene/butadiene star block thermoplastic elasomer as an impact modifying substance in a nonequimolar poly(styrene-co-maleic anhydride) copolymer produces molding compositions which exhibit excellent impact properties as compared with the prior art impact modifying substances. It is also significant to note that the improvements in impact properties obtained by this invention are achieved at appreciable decreases in the percent of rubber employed in the blends. Moreover, the blends of this invention possess excellent flexural modulus and exhibit excellent elevated temperature performance.

It will be evident from the foregoing that various modifications can be made to this invention. Such, however, are considered as being within the scope of the invention.

What is claimed:

1. A thermoplastic molding composition comprising at least one thermoplastic polymer and an impact modifying substance wherein the impact modifying substance is a styrene/butadiene star block thermoplastic elastomer having at least about 5 arms, said impact modifying substance comprising from 20 to 55 percent by weight styrene and being employed in an amount sufficient to provide from about 10 to about 20 percent by weight butadiene in the molding composition.

2. The thermoplastic molding composition of claim 1 in which said thermoplastic polymer is a nonequimolar copolymer containing less than 50 mole percent of an $\alpha,\beta$ ethylenically unsaturated dicarboxylic acid or its anhydride and more than 50 mole percent of a monovinyl substituted aryl hydrocarbon monomer.

3. The molding composition of claim 1 in which said styrene/butadiene star block thermoplastic elastomer has from about 6 to about 12 arms.

* * * * *